United States Patent
Lee et al.

(10) Patent No.: US 8,730,224 B2
(45) Date of Patent: May 20, 2014

(54) STEREOSCOPIC IMAGE DISPLAY DEVICE AND DRIVING METHOD THEREOF

(75) Inventors: Myounghwa Lee, Ulsan (KR); Minhwa Kim, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 969 days.

(21) Appl. No.: 12/840,961

(22) Filed: Jul. 21, 2010

(65) Prior Publication Data

US 2011/0128269 A1   Jun. 2, 2011

(30) Foreign Application Priority Data

Nov. 30, 2009   (KR) .......................... 10-2009-0116815

(51) Int. Cl.
*G06F 3/038*   (2013.01)
*G09G 5/00*   (2006.01)

(52) U.S. Cl.
USPC .......................................................... 345/211

(58) Field of Classification Search
None
See application file for complete search history.

(56) References Cited

U.S. PATENT DOCUMENTS

| 2006/0012593 | A1* | 1/2006 | Iriguchi et al. ................. 345/204 |
| 2008/0117231 | A1* | 5/2008 | Kimpe ............................ 345/629 |
| 2008/0259232 | A1* | 10/2008 | Kim et al. ....................... 349/15 |

* cited by examiner

*Primary Examiner* — Alexander S Beck
*Assistant Examiner* — Kirk Hermann
(74) *Attorney, Agent, or Firm* — McKenna Long & Aldridge, LLP

(57) ABSTRACT

A stereoscopic image display device comprises: a display panel including thin film transistors (TFTs) formed at crossings of data lines and gate lines and m×n (m and n are positive integers) number of pixels divided into main subpixels and auxiliary subpixels; a data driving circuit supplying a data voltage of a two-dimensional (2D) image to the data lines in a 2D mode and supplying a data voltage of a three-dimensional (3D) image to the data lines in a 3D mode; and a gate driving circuit simultaneously supplying gate pulses to a pair of gate lines including neighboring gate lines in the 2D mode and simultaneously supplying gate pulses to even-numbered gate lines in the 3D mode.

12 Claims, 12 Drawing Sheets

STEREOSCOPIC IMAGE DISPLAY DEVICE AND DRIVING METHOD THEREOF

This application claims the benefit of Korean Application No. 10-2009-0116815 filed in Republic of Korea on Nov. 30, 2009 the entire contents of which are hereby incorporated by reference for all purposes as if fully set forth herein.

BACKGROUND OF THE INVENTION

1. Field of the Invention

This document relates to a stereoscopic image display device and driving method thereof capable of implementing a two-dimensional plane image (referred to as a '2D image', hereinafter) and a three-dimensional stereoscopic image (referred to as a '3D image').

2. Discussion of Related Art

A 3D image display device displays a 3D image by using a stereoscopic technique or an autostereoscopic technique.

The stereoscopic technique, which uses a parallax image of user's left and right eyes having a high stereoscopic effect, includes a glass method and a non-glass method which have been put to practical use. In the glass method, a left and right parallax image is displayed on a direct view-based display device by changing a polarization direction of the left and right parallax image or according to a time-division scheme, and a stereoscopic image is implemented by using polarization glasses or liquid crystal shutter glasses. In the non-glass method, generally, an optical plate such as a parallax barrier or the like for separating an optical axis of the left and right parallax image is installed in front of or behind a display screen.

A stereoscopic image display device employing a glass method as shown in FIG. 1 implements a stereoscopic image by using polarization characteristics of a patterned retarder 5 disposed on a display panel 3 and polarization characteristics of polarization glasses 6 worn by a user. The stereoscopic image display device alternately displays a left-eye image (L) and a right-eye image (R) on the display panel 3 and converts the characteristics of polarized light made incident to the polarization glasses 6 through the patterned retarder 5. The stereoscopic image display device may spatially divide the left-eye image (L) and the right-eye image (R) viewed by the user by differentiating the characteristics of polarized light of the left-eye image (L) and the characteristics of polarized light of the right-eye image (R) in order to implement a 3D image. In FIG. 1, reference numeral 1 denotes a backlight unit irradiating light to the display panel 3, and reference numerals 2 and 4 denote polarizer films attached to upper and lower plates of the display panel 3 in order to select a linear polarized light, respectively.

The stereoscopic image display device illustrated in FIG. 1 has a degraded visibility of a 3D image due to crosstalk generated at the position of a vertical viewing angle. Actually, only light of the left-eye image is supposed to pass through user's left eye and only light of the right-eye image is supposed to pass through user's right eye, and in this case, if light of left-eye image and light of the right-eye image are all made incident to user's left and right eyes, the user is bound to feel crosstalk. When the user views the display panel 3 from an upper side or from a lower side, not from a front side, light of the left-eye image and light of the right-eye image pass through a left-eye patterned retarder and a right-eye patterned retarder, respectively, at a vertical viewing angle greater by more than a certain angle than a front viewing angle, generating crosstalk. Thus, the stereoscopic image display device has a very narrow viewing angle at which a 3D image can be viewed without crosstalk.

Japanese Laid Open Publication No. 2002-185983 proposes a method for forming black stripes (BS) on a patterned retarder in order to increase the vertical viewing angle of the stereoscopic image display device as illustrated in FIG. 1. In this method, when the user observes the stereoscopic image display device at a location away by a certain distance (D) from the stereoscopic image display device, theoretically, a vertical viewing angle ($\alpha$) at which no crosstalk is generated relies on the size of a black matrix (BM) formed on the display panel, the size of a black stripe (BS) formed on the patterned retarder, and the distance (S) between the display panel and patterned retarder. The vertical viewing angle ($\alpha$) widens as the size of the black matrix (BM) and the black strip (BS) increases and as the distance (S) between the display panel and the patterned retarder decreases.

The stereoscopic image display device having the black stripes (BS) on the patterned retarder as shown in FIG. 2, however, has the following problems.

First, although the black stripes (BS) formed on the patterned retarder contribute to improve the vertical viewing angle of the stereoscopic image display device to a degree, they interact with the black matrixes (BM) formed on the display panel, causing moiré. Thus, when a 2D image is displayed on the stereoscopic image display device, visibility of the 2D image is drastically degraded due to moiré. FIG. 3 shows the results of an experimentation obtained by observing a 2D image displayed on a 47-inch stereoscopic image display device at a location 4-meter away from the stereoscopic image display device after black stripes are formed on a patterned retarder of the stereoscopic image display device. This experimentation results reveal that moirés of some 90 mm, 150 mm, and 355 mm are seen at observation locations A, B, and C, respectively.

Second, when a 2D image is displayed on the stereoscopic image display device, the luminance of the 2D image is significantly degraded due to the presence of the black stripes (BS) on the patterned retarder. This is because the black stripes (BS) formed on the patterned retarder cover some pixels of the display panel.

SUMMARY OF THE INVENTION

An aspect of this document is to provide a stereoscopic image display device and driving method thereof capable of enhancing display quality of a two-dimensional (2D) image and a three-dimensional (3D) image and preventing an increase of a driving frequency and power consumption in displaying the 2D image and the 3D image.

In an aspect, a stereoscopic image display device comprises: a display panel comprising thin film transistors (TFTs) formed at crossings of data lines and gate lines and m×n (m and n are positive integers) number of pixels divided into main subpixels and auxiliary subpixels; a data driving circuit supplying a data voltage of a 2D image to the data lines in a 2D mode and supplying a data voltage of a 3D image to the data lines in a 3D mode; and a gate driving circuit simultaneously supplying gate pulses to a pair of gate lines including neighboring gate lines in the 2D mode and simultaneously supplying gate pulses to even-numbered gate lines in the 3D mode.

In another aspect, a method for driving a stereoscopic image display device comprises: supplying a data voltage of a 2D image to data lines in a 2D mode; simultaneously supplying gate pulses to a pair of gate lines including neighboring gate lines in the 2D mode; supplying a data voltage of a 3D image to the data lines in a 3D mode; and simultaneously supplying gate pulses to even-numbered data lines in the 3D mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
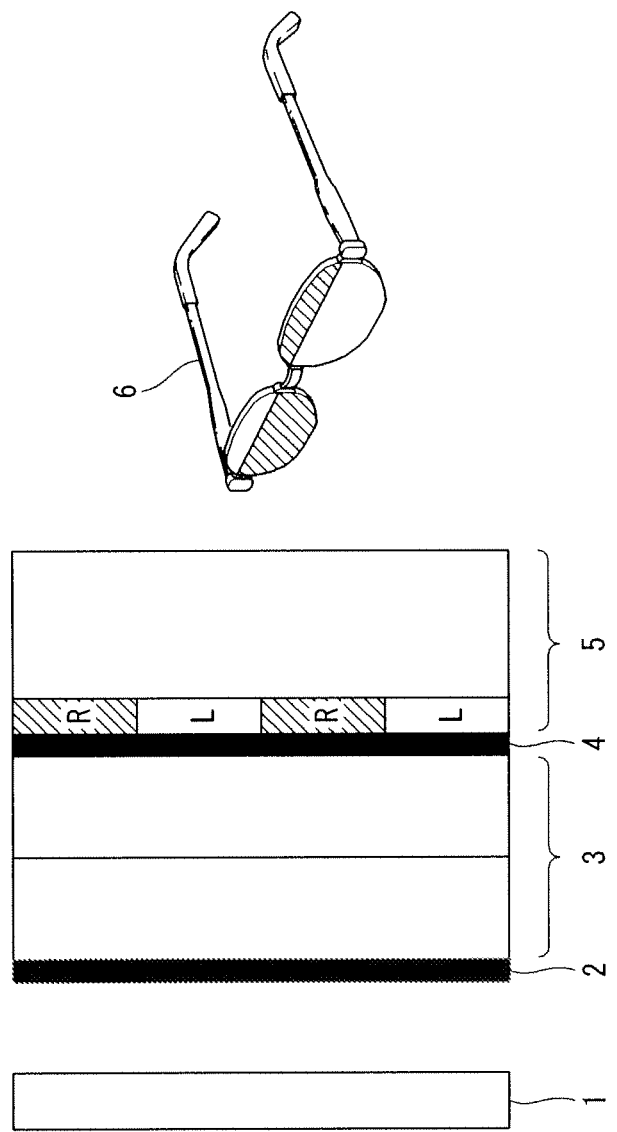
FIG. 1 is a drawing illustrating a stereoscopic image display device employing a glass method.
Figure 2:
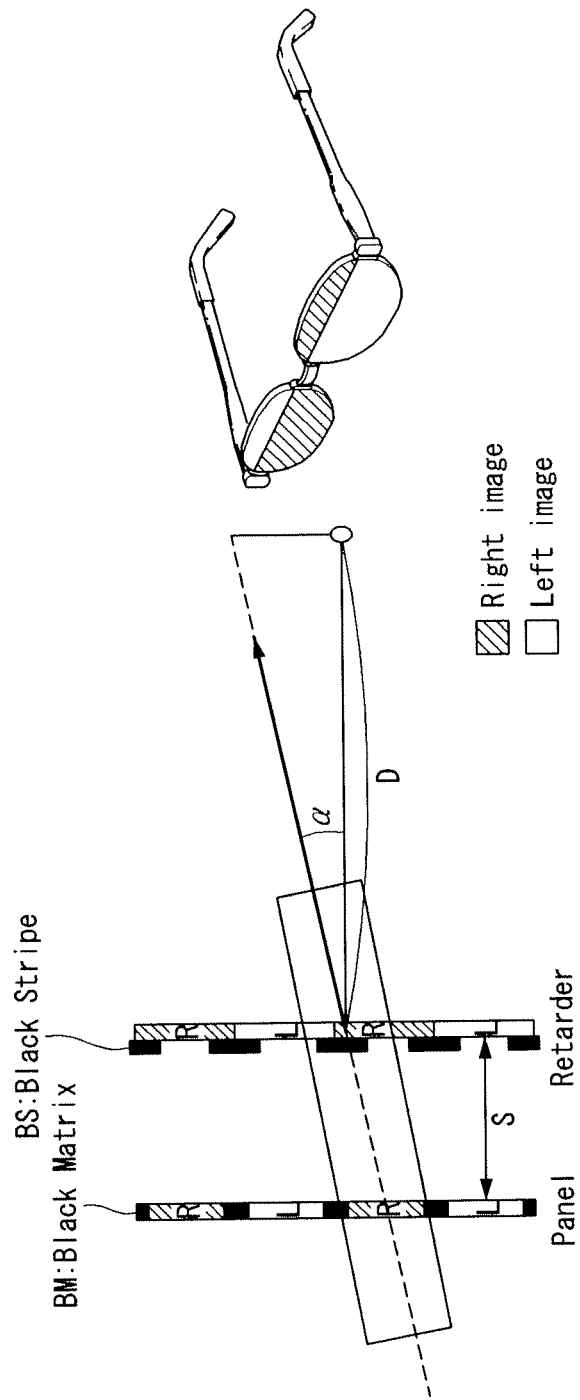
FIG. 2 is a drawing illustrating a stereoscopic image display device including black stripes formed on a patterned retarder.

Hereinafter, an implementation of this document will be described in detail with reference to the attached drawings. The same reference numerals will be used throughout to designate the same or like components. In describing the present invention, if a detailed explanation for a related known function or construction is considered to unnecessarily divert the gist of the present invention, such explanation will be omitted but would be understood by those skilled in the art.

Figure 4:
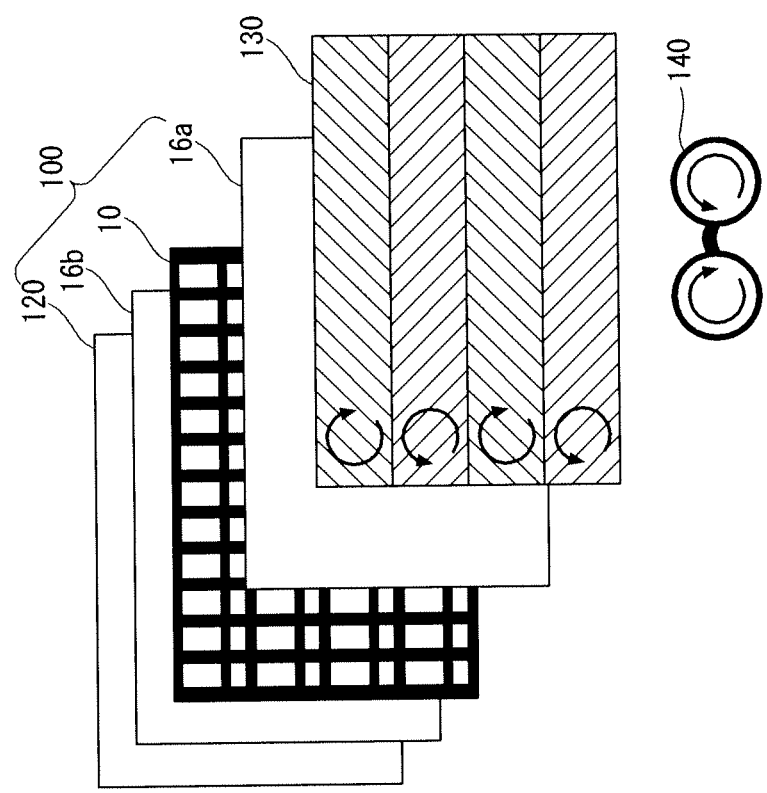
FIG. 4 is an exploded perspective view of a display panel, a patterned retarder, and polarization glasses of an image display device according to an exemplary embodiment of the present invention.
Figure 5:
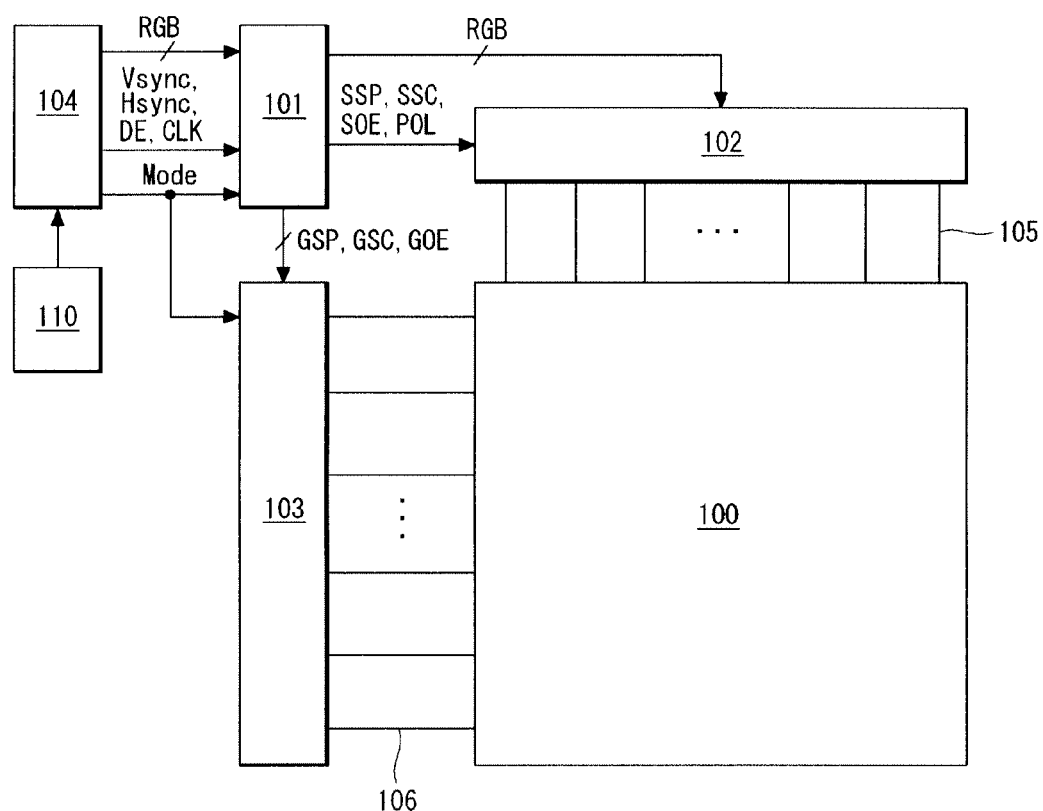
FIG. 5 is a schematic block diagram showing driving circuits of the display panel of FIG. 4.

FIGS. 4 and 5 illustrate a stereoscopic image display device according to an exemplary embodiment of the present invention.

With reference to FIGS. 4 and 5, the stereoscopic image display device according to an exemplary embodiment of the present invention comprises a display panel 100, a patterned retarder 130, polarization glasses 140, and driving circuits 101 to 104 of the display panel.

The display panel 100, a display device for displaying a 2D image and 3D image data, may be implemented as a flat panel display device such as liquid crystal display (LCD), field emission display (FED), plasma display panel (PDP), electroluminescence device (EL) including an inorganic electro luminescence and organic light emitting diode (OLED), electrophoresis (EPD), and the like. Hereinafter, as the display panel 100, a display panel of an LCD will be described.

The display panel 100 comprises two glass substrates and a liquid crystal layer interposed between the glass substrates. The display panel 100 comprises liquid crystal cells disposed in a matrix form according to a crossing structure of data lines 105 and gate lines 106.

A lower glass substrate of the display panel 100 comprises a pixel array 10 comprising the data lines 105, the gate lines 106, thin film transistors (TFTs), and a storage capacitor Cst. The liquid crystal cells are connected with the TFTs and driven by an electric field between pixel electrodes and a common electrode. An upper glass substrate of the display panel 100 comprises black matrixes, color filters, and the common electrode formed thereon. The polarizer films 16a and 16b are attached to the upper and lower glass substrates of the display panel 100, and an alignment film for setting a pre-tilt angle of liquid crystal is formed. In a vertical field driving mode such as a twisted nematic (TN) mode and a vertical alignment (VA) mode, the common electrode is formed on the upper glass substrate, and in a horizontal field driving mode such as an in-plane switching (IPS) mode and a fringe field switching (FFS) mode, the common electrode is formed together with pixel electrodes on the lower glass substrate. Columnar spacers may be formed between the glass substrates in order to maintain a cell gap of the liquid crystal cells.

The display panel 100 may be implemented in any liquid crystal mode as well as in the TN mode, VA mode, IPS mode, and FFS mode. The LCD according to an exemplary embodiment of the present invention may be implemented in any form of a transmissive LCD, a transflective LCD, a reflective LCD, and the like. The transmissive LCD and the transflective LCD needs a backlight unit 120. The backlight unit 120 may be divided into a direct type backlight unit and an edge type backlight unit.

In a two-dimensional (2D) mode, a 2D image is displayed at odd-numbered lines and even-numbered lines of the pixel array 10. In a three-dimensional (3D) mode, a left-eye image (or a right-eye image) is displayed at odd-numbered lines of the pixel array 10 and a right-eye image (or a left-eye image) is displayed at even-numbered lines. Light of an image displayed on the pixel array 10 is made incident to odd-numbered lines of the patterned retarder 130 through the upper polarizer film 16a.

The patterned retarder 130 is attached to the upper polarizer film 16a of the display panel 100. A first retarder is formed at the odd-numbered lines of the patterned retarder 130. A second retarder is formed at the even-numbered lines of the patterned retarder 130. A light absorption axis of the first retarder is different from that of the second retarder. The first retarder of the patterned retarder 130, facing the odd-numbered lines of the pixel array 10, allows first polarized light (circularly polarized light or linearly polarized light) of light made incident from the odd-numbered lines of the pixel array 10 to transmit therethrough. The second retarder of the patterned retarder 130, facing the even-numbered lines of the pixel array 10, allows second polarized light (circularly polarized light or linearly polarized light) of light made incident from the even-numbered lines of the pixel array 10 to transmit therethrough. The first retarder of the patterned retarder 130 may be implemented as a polarization filter allowing a left circularly polarized light to transmit therethrough, and the second retarder may be implemented as a polarization filter allowing a right circularly polarized light to transmit therethrough. The patterned retarder 130 does not need a black stripe because some of the pixels of the pixel array 10 serve as active black stripes (to be described).

A left-eye polarization filter of the polarization glasses 140 has the same light absorption axis as that of the first retarder of the patterned retarder 130. A right-eye polarization filter of the polarization glasses 140 has the same light absorption axis as that of the second retarder of the patterned retarder 130. For example, the left-eye polarization filter of the polarization glasses 140 may be selected as a left circular polarization filter; and the right-eye polarization filter of the polarization glasses 140 may be selected as a right circuit polarization filter. The user may put on the polarization glasses 140 to view a 3D image displayed on the stereoscopic image display device and take off the polarization glasses 140 in viewing a 2D image displayed on the stereoscopic image display device.

The driving circuits 101 to 104 of the display panel 100 comprise a data driving circuit 102, a gate driving circuit 103, and a timing controller 101.

Each of source drive ICs of the data driving circuit 102 comprises a shift register, a latch, a digital-to-analog converter (DAC), an output buffer, and the like. The data driving circuit 102 latches digital video data (RGB) under the control of the timing controller 101. In response to a polarity control signal (POL), the data driving circuit 102 converts the digital video data (RGB) into an analog positive polarity gamma compensation voltage and a negative polarity gamma compensation voltage to invert the polarity of a data voltage. In response to the polarity control signal POL, the data driving circuit 102 inverts the polarity of data voltages output to the gate lines 105. The source drive ICs of the data driving circuit 102 may be mounted on a tape carrier package (TCP) and bonded to the lower glass substrate of the display panel 100 through tape automated bonding (TAB).

The data voltages outputted from the data driving circuit 102 in the 2D mode are data voltages of a 2D image. Data voltages of odd-numbered lines outputted from the data driving circuit 102 are data voltages of a left-eye image (or right-eye image), and data voltages of even-numbered lines are data voltages of a right-eye image (or left-eye image). In the 3D mode, the data driving circuit 102 sequentially supplies data voltages of a 3D image to be charged in main subpixels of every odd-numbered line and even-numbered line at every frame period to the data lines 105 by the lines, and then it finally simultaneously supplies a black data voltage to be charged in auxiliary subpixels of every odd-numbered line and even-numbered line to the data lines 105. The main subpixels and the auxiliary subpixels will be described later with reference to FIG. 6.

The gate driving circuit 103 comprises a shift register, a multiplexer array, a level shifter, and the like. The gate driving circuit 103 sequentially supplies a gate pulse to the gate lines 106 under the control of the timing controller 101. The gate driving circuit 103 may be mounted on a TCP so as to be bonded to the lower glass substrate of the display panel 100 through a TAB process or may be directly formed together with the pixel array 10 on the lower glass substrate through a gate in a panel (GIP) process.

Figure 11:
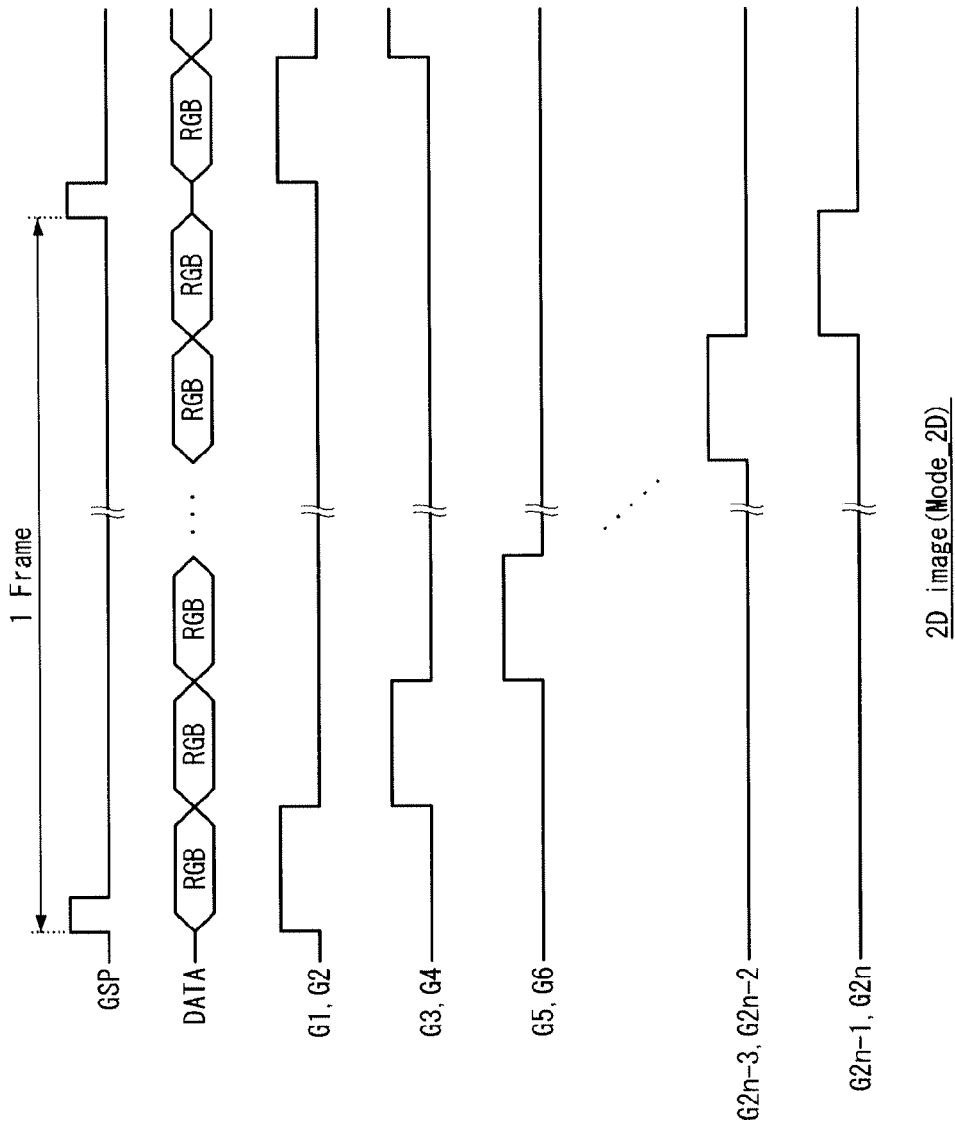
FIG. 11 is a waveform view showing a data voltage and a gate pulse in the 2D mode.

In the 2D mode, in response to a mode signal (Mode) of a first logic value and a gate timing control signal from the timing controller 101, the gate driving circuit 103 simultaneously supplies a gate pulse to (2i−1)th gate line (i is a positive integer) and 2ith gate line, and then, simultaneously supplies a gate pulse to a next (2i−1)th gate line and 2ith gate line. For example, as shown in FIG. 11, in the 2D mode, the gate driving circuit 103 simultaneously supplies a first gate pulse to first and second gate lines G1 and G2 and then simultaneously supplies a gate pulse to third and fourth gate lines G3 and G4. Thus, in the 2D mode, the gate driving circuit 103 shifts the gate pulses supplied to the gate lines in units of a pair of gate lines.

Figure 13:
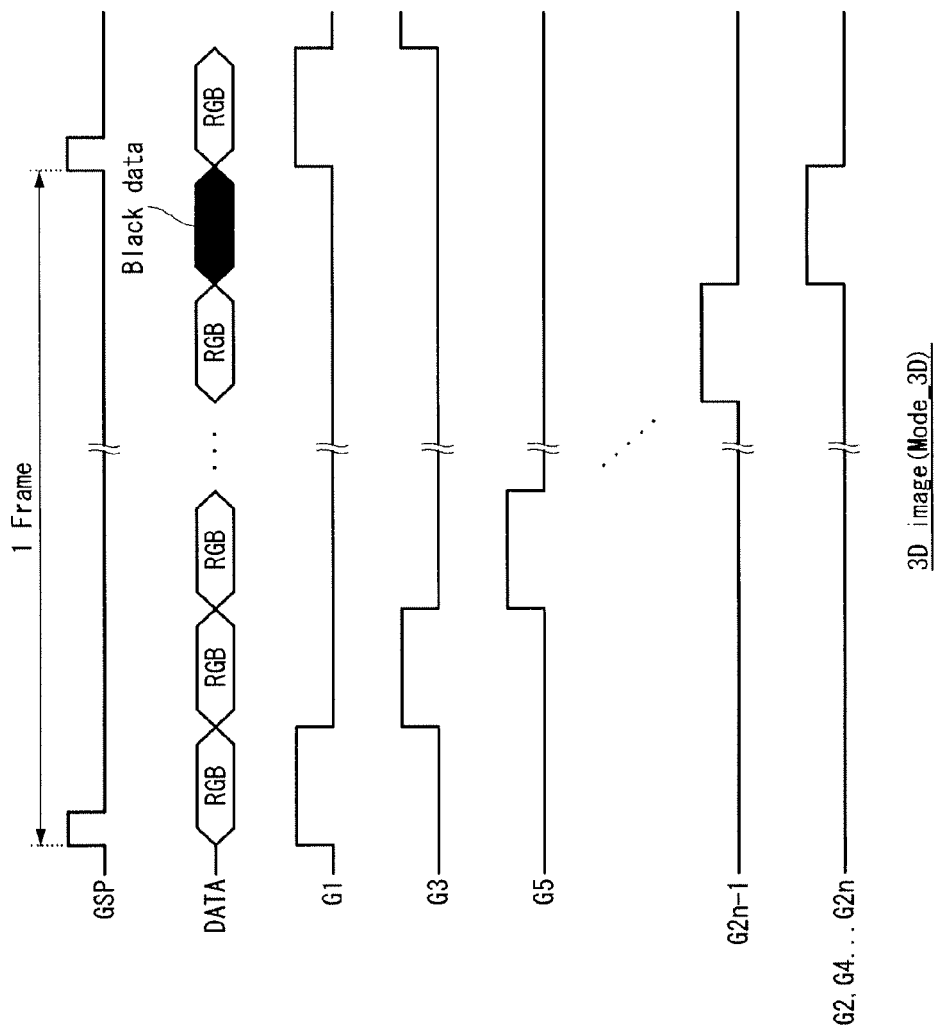
FIG. 13 is a waveform view showing a data voltage and a gate pulse in the 3D mode.

In the 3D mode, in response to a mode signal (Mode) of a second logic value and a gate timing control signal from the timing controller 101, the gate driving circuit 103 sequentially supplies a gate pulse to the odd-numbered gate lines, and then simultaneously supplies a gate pulse to the even-numbered gate lines. For example, as shown in FIG. 13, in the 3D mode, the gate driving circuit 103 sequentially supplies a gate pulse to the odd-numbered gate lines G1, G3, . . . , G2n−1 and then finally simultaneously supplies a gate pulse to the even-numbered gate lines G2, G4, . . . , G2n. Thus, in the 3D mode, the gate driving circuit 103 simultaneously supplies the gate pulse to the even-numbered gate lines after shifting the gate pulse supplied to the odd-numbered gate lines.

Upon receiving timing signals such as a vertical synchronization signal Vsync, a horizontal synchronization signal Hsync, a data enable signal DE, a dot clock CLK, and the like, from a system board 104, the timing controller 101 generates control signals for controlling an operation timing of the data driving circuit 102 and the gate driving circuit 103. The control signals comprise a gate timing control signal for controlling an operation timing of the gate driving circuit 103 and a data timing control signal for controlling an operation timing of the data driving circuit 102 and the polarity of a data voltage. The timing controller 101 determines a 2D or 3D mode upon receiving a mode signal Mode from the system board 104, realigns currently inputted digital video data (RGB) according to the format of a 2D image or 3D image displayed on the display panel 100, and supplies them to the data driving circuit 102.

The gate timing control signal includes a gate start pulse (GSP), a gate shift clock (GSC), a gate output enable signal (GOE), and the like. The gate start pulse (GSP) is applied to the gate drive IC to control the gate drive IC to generate a first gate pulse. The gate shift clock (GSC) is a clock signal commonly inputted to the gate drive ICs, which shifts the gate start pulse (GSP). The gate output enable signal (GOE) controls an output of the gate drive ICs.

The data timing control signal comprises a source start pulse (SSP), a source sampling clock (SSC), a polarity control signal (POL), a source output enable signal (SOE), and the like. The source start pulse (SSP) controls a data sampling start timing of the data driving circuit 102. The source sampling clock (SSC) is a clock signal that controls a sampling timing of data within the data driving circuit 102 based on a rising or falling edge. The polarity control signal (POL) controls the polarity of a data voltage outputted from the data driving circuit 102. The source output enable signal (SOE) controls an output timing of the data driving circuit 102. When digital video data to be inputted to the data driving circuit 102 is transmitted in the mini LVDS (Low Voltage Differential Signaling) interface standard, the source start pulse (SSP) and the source sampling clock (SSC) may be omitted.

Figure 3:
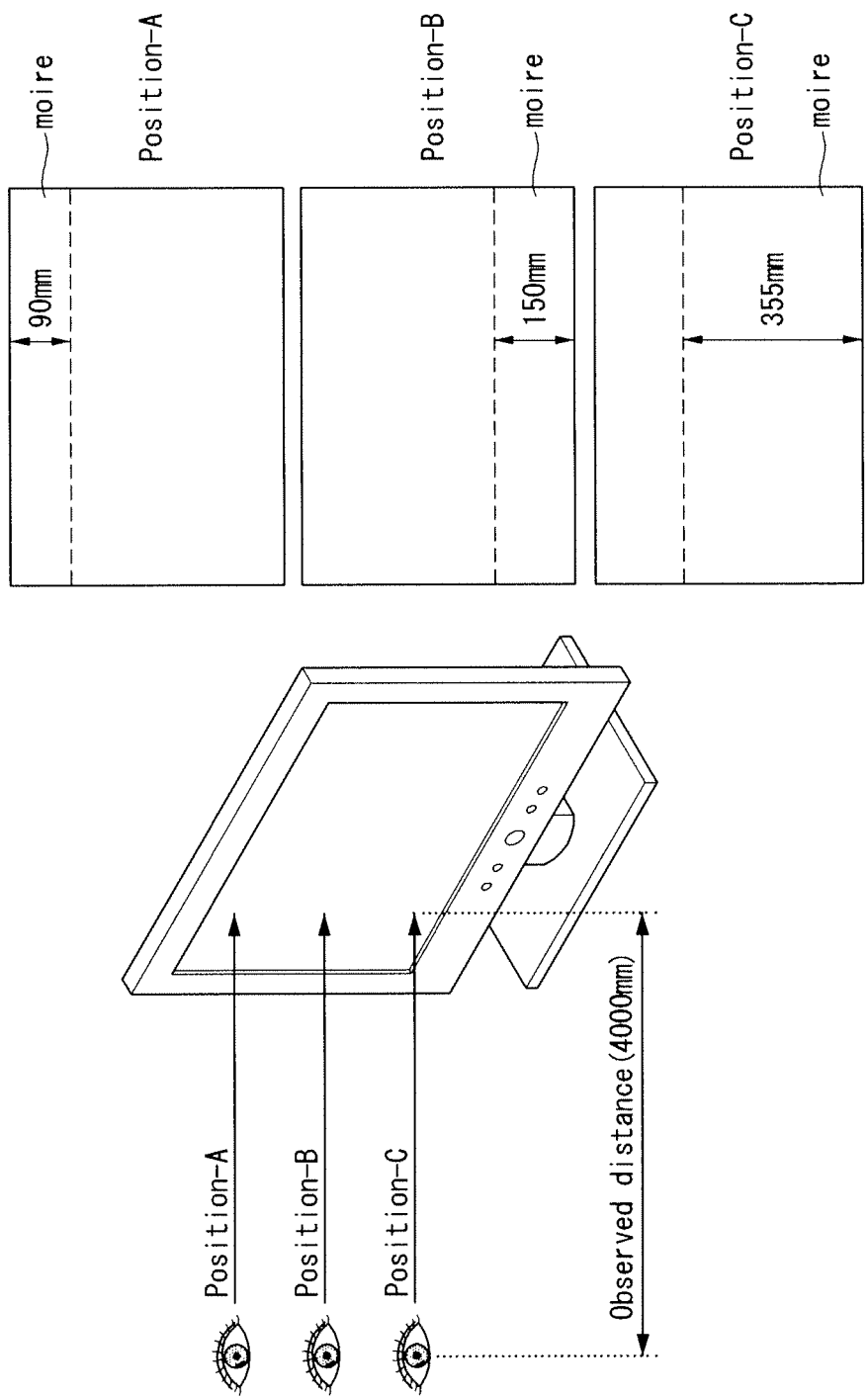
FIG. 3 is a drawing illustrating the results of experimentation showing moiré caused due to the black stripes formed on the patterned retarder.

The system board 104 supplies data of a 2D image or a 3D image and timing signals Vsync, Hsync, DE, CLK to the timing controller 101 via an interface such as LVDS (Low Voltage Differential Signaling) interface, TMDS (Transition Minimized Differential Signaling) interface, and the like. The system board 104 supplies the mode signal (Mode) indicating the 2D mode and the 3D mode to the timing controller 101 and the gate driving circuit 103. The system board 104 supplies a 2D image to the timing controller 101 in the 2D mode, and supplies a 3D image including a left-eye image and a right-eye image to the timing controller 101 in the 3D mode. The system board 104 may transmit data of a 2D image at a frame frequency of 60 Hz or 60×N (N is a positive integer of 2 or larger) Hz in the 2D mode. Also, the system board 104 can transmit data of a 3D image at a frame frequency of 60×NHz in the 3D mode as shown in FIG. 3.

The user may select the 2D mode and the 3D mode via a user interface 110. The user interface 110 may comprise a touch screen attached on the display panel 100 or installed in the display panel 100, an on screen display (OSD), a keyboard, a mouse, a remote controller, and the like. The system board 104 converts a 2D mode operation and a 3D mode operation in response to user data inputted via the user interface 110. The system board 104 may convert the 2D mode operation and the 3D mode operation through a 2D and 3D identification code encoded in data of an input image.

Figure 6:
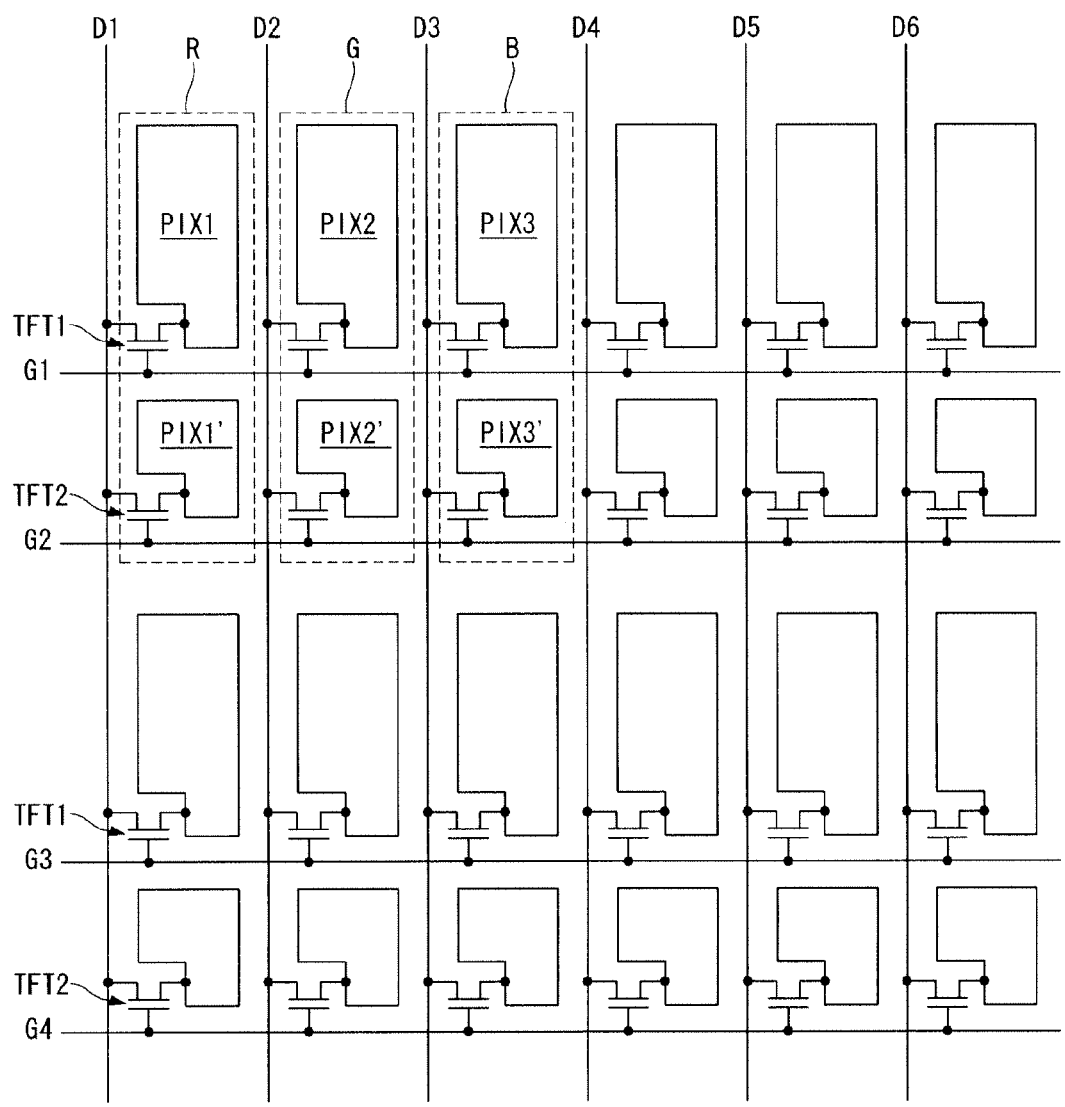
FIG. 6 is a circuit diagram showing in detail a portion of a pixel array in FIG. 4.

FIG. 6 is a circuit diagram showing in detail a portion of the pixel array 10 in FIG. 4.

With reference to FIG. 6, the odd-numbered lines and even-numbered lines of the pixel array 10 include m×n (m and m are positive integers) number of pixels, respectively. Each pixel includes a liquid crystal cell of a red subpixel (R), a liquid crystal cell of a green subpixel (G), and a liquid crystal cell of a blue subpixel (B).

The subpixels are divided into main subpixels and auxiliary subpixels. The main subpixels comprise main pixel electrodes PIX1~PIX3 and a first TFT (TFT1), respectively. The first TFT (TFT1) supplies a data voltage from the data lines D1~D6 to the main pixel electrode PIX1 in response to a gate pulse from an odd-numbered gate line, namely, a first gate line G1. A gate electrode of the first TFT (TFT1) is connected with the first gate line. A drain electrode of the first TFT (TFT1) is connected with a data line D1 and a source electrode of the first TFT (TFT1) is connected with the main pixel electrode PIX1. The auxiliary subpixels comprise auxiliary pixel electrodes PIX1'~PIX3' and a second TFT (TFT2). The second TFT (TFT2) supplies a data voltage from data lines D1~D6 to the auxiliary pixel electrode PIX1' in response to a gate pulse from an even-numbered gate line, namely, from a second gate line G2. A gate electrode of the second TFT (TFT2) is connected with the second gate line G2. A drain electrode of the second TFT (TFT2) is connected with the data line D1, and a source electrode of the second TFT (TFT2) is connected with the auxiliary pixel electrode PIX1'. The main subpixels and the auxiliary subpixels may include a storage capacitor, respectively.

In the 2D mode, the main subpixels charge red, green, and blue data voltages of a 2D image. In the 3D mode, the main subpixels charge red, green, and blue data voltages of a left image or right image of a 3D image.

In the 2D mode, the auxiliary subpixels charge red, green, and blue data voltages of a 2D image to increase luminance and chromaticity of the 2D image to thus enhance display quality of the 2D image. In the 3D mode, the auxiliary subpixels charge a black data voltage to serve as an active black stripe to enhance a vertical viewing angle of the stereoscopic image display device.

Figure 7:
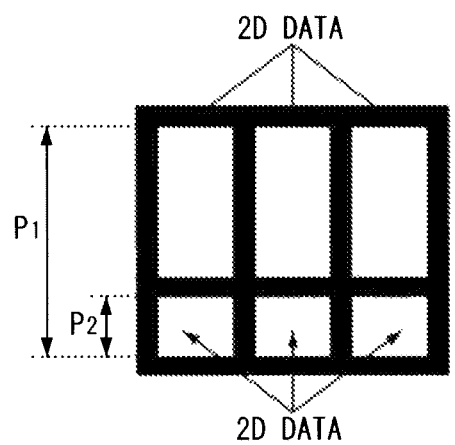
FIG. 7 is a drawing illustrating data inputted to the pixels as shown in FIG. 6 in a 2D mode.
Figure 8:
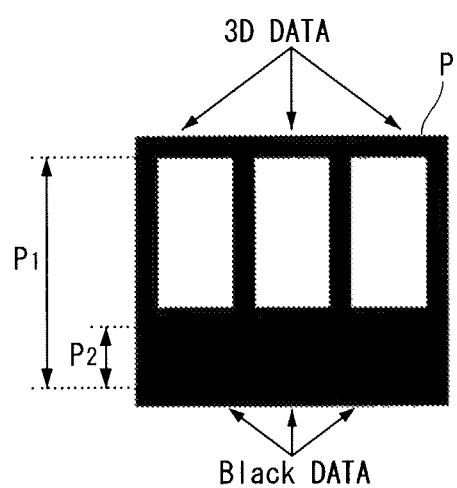
FIG. 8 is a drawing illustrating data inputted to the pixels as shown in FIG. 6 in a 3D mode.

FIG. 7 is a drawing illustrating data inputted to the pixels as shown in FIG. 6 in the 2D mode, and FIG. 8 is a drawing illustrating data inputted to the pixels as shown in FIG. 6 in the 3D mode.

With reference to FIG. 7, in the 2D mode, a data voltage of a 2D image is supplied to the main subpixels and auxiliary subpixels of each pixel. In the 2D mode, the first and second TFTs (TFT1 and TFT2) are simultaneously turned on in response to the gate pulses simultaneously supplied to the (2i−1)th gate line and 2ith gate line. Accordingly, liquid crystal cells of a main subpixel and an auxiliary subpixel of the R subpixel simultaneously charge red data voltage. Likewise, liquid crystal cells of the main subpixel and the auxiliary subpixel of the G subpixel simultaneously charge green data voltage, and liquid crystal cells of the main subpixel and the auxiliary subpixel of the B subpixel simultaneously charge blue data voltage.

With reference to FIG. 8, in the 3D mode, the data voltage of the 3D image is supplied to the main subpixel of each pixel, and a black data voltage is supplied to the auxiliary subpixel. In the 3D mode, the first TFTs are turned on in response to the gate pulses sequentially supplied to the odd-numbered gate lines. In comparison, in the 3D mode, the second TFTs are simultaneously turned on in response to the gate pulse simultaneously supplied to the even-numbered gate lines after the gate pulses are all applied to the odd-numbered gate lines. Thus, the liquid crystal cells of all the main subpixels of the pixel array are simultaneously charged with the red, green, and blue data voltages by the lines. The liquid crystal cells of the auxiliary subpixels are charged with the black data voltage simultaneously during the last one horizontal period after the liquid crystal cells of all the main subpixels are charged with the data voltage.

A vertical pitch P2 of the auxiliary subpixel greatly affects the vertical viewing angle and luminance of the 3D image. The vertical viewing angle of the 3D image is proportional to the rate $\{(P2*100)/P1\}$ of the vertical pitch P2 of the auxiliary subpixels to the vertical pitch P1, while the luminance of the 3D image is inverse proportional to the rate $\{(P2*100)/P1\}$. Accordingly, the vertical pitch P1 of the main subpixels and the vertical pitch P2 of the auxiliary subpixels should be properly designed in consideration of the vertical viewing angle and luminance of the 3D image, and the vertical pitch P2 of the auxiliary subpixel should be smaller than the vertical pitch P1 of the main subpixel.

In the stereoscopic image display device according to an exemplary embodiment of the present invention, each pixel existing at each line of the pixel array is divided into a main subpixel and an auxiliary subpixel. A pair of gate lines are formed at each line of the pixel array. Accordingly, when gate pulses are sequentially supplied to the gate lines in the 2D mode and in the 3D mode, respectively, the driving frequency of the gate driving circuit 103 is increased to double and power consumption and the amount of generated heat increase as much, compared with the existing LCD in which a single gate line is formed at each line of a pixel array. Also, a driving frequency of the data driving circuit 102 that outputs a data voltage in synchronization with the gate pulse is increased to double and power consumption and the amount of generated heat increase as much. Thus, in order to solve this problem, in the present invention, a multiplexer array is added in the gate driving circuit 103 in a different manner in the 2D mode and in the 3D mode to prevent the increase in the driving frequency of the gate driving circuit 103 and the data driving circuit 102 as well as prevent the increase in the power consumption and the amount of generated heat. The multiplexer array selectively short-circuits the channels of the gate pulses.

FIGS. 9 to 13 show a detailed circuit configuration and operational examples of the gate driving circuit 103 according to an exemplary embodiment of the present invention.

Figure 9:
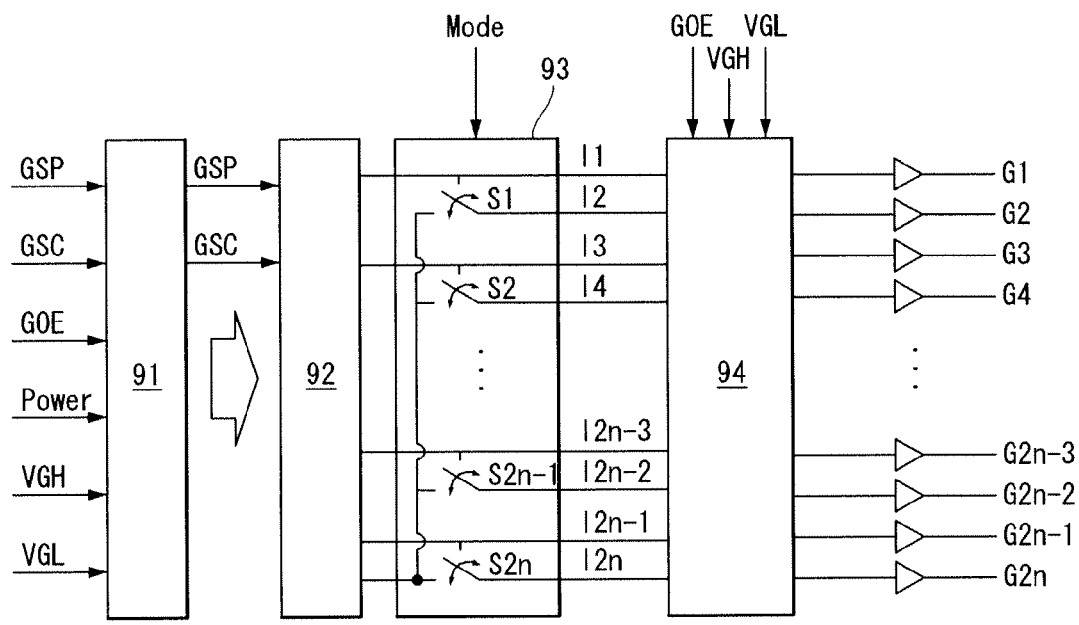
FIG. 9 is a circuit diagram showing in detail a gate driving circuit according to an exemplary embodiment of the present invention.

With reference to FIG. 9, the gate driving circuit 103 comprises a shift register 92, a multiplexer array 93, a level shifter 94, and the like.

The timing controller 101 inputs the gate timing control signals GSP, GSC, and GOE for controlling an operation timing of the gate driving circuit 103 to an internal logic circuit 91, and the logic circuit 91 supplies the gate start pulse GSP and the gate shift clock GSC to the shift register 92 of the gate driving circuit 103. The shift register 92 shifts the gate start pulse (GSP) in synchronization with a rising edge or a falling edge of the gate shift clock (GSC) and sequentially supplies gate pulses to the multiplexer array 93.

The multiplexer array 93 receives (n+1) number of gate pulses from the shift register 92 and sequentially generates 2n number of outputs. The multiplexer array 93 transmits first to nth input signals to odd-numbered input terminals I1, I3, ... I2n−1 of the level shifter 94 as it is. In the 2D mode, the multiplexer array 93 sequentially short-circuits the (2i−1)th input terminal and 2ith input terminal of the level shifter 94 at every frame period by using a plurality of switching elements S1~S2n controlled by the mode signal (Mode), and in the 3D mode, the multiplexer array 93 short-circuits even-numbered input terminals of the level shifter 94 to the last one horizontal line at every frame period. Thus, the multiplexer array 93 selects each branch path of the output signals of the shift register 92 according to the mode signal (Mode).

Figure 10:
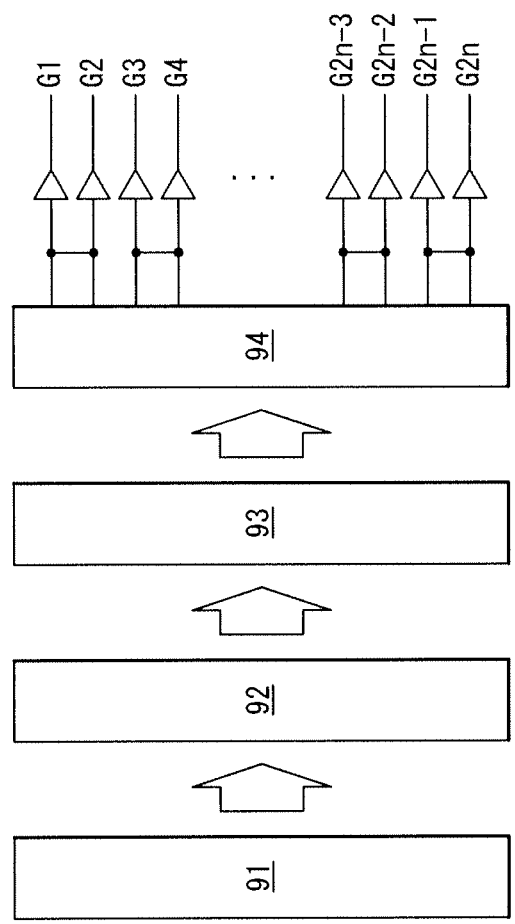
FIG. 10 is a circuit diagram showing an operation of the gate driving circuit in FIG. 9 in the 2D mode.

In the 2D mode, the first switch element S1 connects first and second input terminals I1 and I2 of the level shifter 94 to a first output terminal of the shift register 92 in response to the mode signal (Mode) of the first logic value. Subsequently, the second switch element S2 connects third and fourth input terminals I3 and I4 of the level shifter 94 to a second output terminal of the shift register 92 in response to the mode signal (Mode) of the first logic value. The first to 2nth switch elements S1~S2n sequentially operate in response to the mode signal (Mode) of the first logic value to short-circuit the (2i−1)th input terminal and the 2ith input terminal as shown in FIG. 10. As a result, the gate pulses supplied to the gate lines G1~G2n through the level shifter 94 are simultaneously supplied to the two neighboring gate lines G1 and G2, G3 and G4, ..., G2n−1 and G2n with the same pulse width as that of the gate pulse supplied to the n number of gate lines as shown in FIG. 11. The data driving circuit 102 outputs data voltages of the 2D image in synchronization with the gate pulses supplied to the gate lines G1~G2n.

Figure 12:
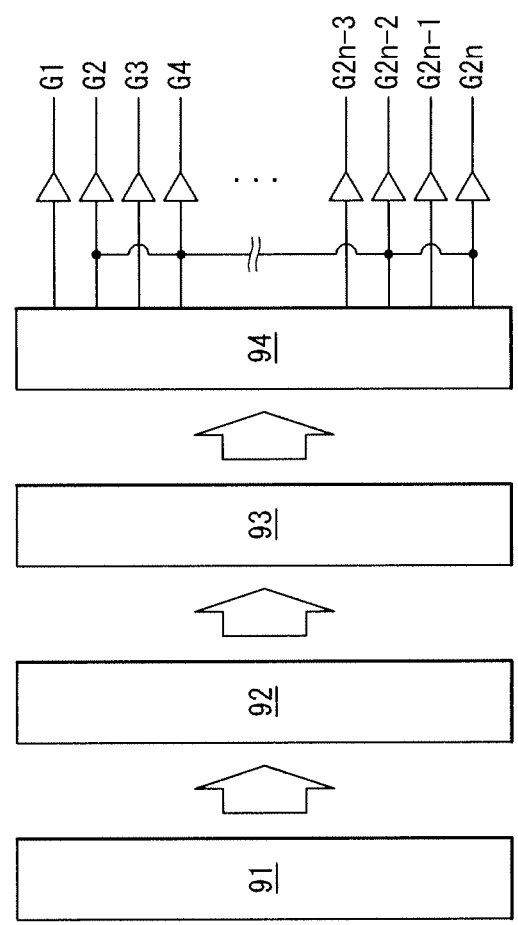
FIG. 12 is a circuit diagram showing an operation of the gate driving circuit illustrated in FIG. 9 in the 3D mode.

In the 3D mode, the first to 2nth switch elements S1~S2n open a current path between the (2i−1)th input terminal and the 2ith input terminal of the level shifter 94 in response to the mode signal (Mode) of the second logic value, and as shown in FIG. 12, the first to 2nth switch elements S1~S2n connect all the even-numbered input terminals I2, I4, ..., I2n of the level shifter 94 to the (n+1)th output terminal of the shift register 92. The gate pulses are sequentially outputted through the output terminals of the shifter register 92, and the last gate pulse is outputted through the (n+1)th output terminal. Thus, in the 3D mode, after the output signals of the shift register 92 are sequentially supplied to the odd-numbered input terminals I1, I3, ..., I2n−1, the last gate pulse outputted through the (n+1)th output terminal of the shift register 92 is simultaneously supplied to all the even-numbered input terminals I2, I4, ..., I2n of the level shifter 94. As a result, the gate pulses, which are supplied to the gate lines G1~G2n through the level shifter 94, are sequentially supplied to the odd-numbered gate lines G1, G3, ..., G2n1 with the same pulse width as that of the gate pulse supplied to the n number of gate lines, and then simultaneously supplied to the even-numbered gate lines G2, G4, ..., G2n during the last one horizontal period as shown in FIG. 13. The data driving circuit 102 outputs the data voltages of the 3D image in synchronization with the gate pulse supplied to the gate lines G1~G2n and then outputs the black data voltage during the last one horizontal period.

The level shifter 94 converts an output voltage swing width of the multiplexer array 93 into a swing width between a gate high voltage VGH and a gate low voltage VGL. The output voltage of the multiplexer array 93 has a transistor-transistor logic (TTL) level swung between 0V and 3.3V. The gate high voltage (VGH) is a voltage of a threshold voltage of the TFT or higher, and the gate low voltage VGL is a voltage lower than the threshold voltage of the TFT. The level shifter 94 outputs the gate pulse swung between the gate high voltage (VGH) and the gate low voltage (VGL) to the gate lines G1~G2n in response to the gate output enable signal (GOE).

The multiplexer array 93 is not limited to the configuration in FIG. 9. For example, the multiplexer array 93 may be disposed between the level shifter 94 and the gate lines G1~G2n. Also, in this case, the outputs of the gate driving circuit 103 are those as shown in FIGS. 10 to 13.

In the stereoscopic image display device, the display device is not limited to the LCD. For example, the display panel 100 and the backlight unit 120 may be replaced by the flat panel display device such as field emission display (FED), plasma display panel (PDP), electroluminescence device (EL) including an inorganic electro luminescence and organic light emitting diode (OLED), electrophoresis (EPD), and the like.

As described above, in the exemplary embodiment of the present invention, the pixels of the lines of the pixel array are divided into main subpixels in which a data voltage of a 2D image and that of a 3D image are selectively written and auxiliary subpixels in which a data voltage and a black data voltage of a 2D image are selectively written. Thus, the luminance and chromaticity of the 2D image can be enhanced through the auxiliary subpixels, to thereby improve display quality of the 2D image and a viewing angle and display quality of the 3D image.

In addition, in the 2D mode, gate pulses are simultaneously supplied to the gate lines of the main subpixels and the gate lines of the auxiliary subpixels, and in the 3D mode, the gate pulses are sequentially supplied to the gate lines of the main subpixels and then the gate pulses are simultaneously supplied to the gate lines of the auxiliary subpixels. As a result, the driving frequency, power consumption, and the amount of generated heat of the gate driving circuit and the data driving circuit are not increased in driving the display panel.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A stereoscopic image display device comprising:
a display panel comprising thin film transistors (TFTs) formed at crossings of data lines and gate lines and mxn (m and n are positive integers) number of pixels divided into main subpixels and auxiliary subpixels;
a data driving circuit supplying a data voltage of a two dimensional (2D) image to the data lines in a 2D mode and supplying a data voltage of a three-dimensional (3D) image to the data lines in a 3D mode; and a gate driving circuit simultaneously supplying gate pulses for selecting the main subpixels and the auxiliary subpixels to a pair of gate lines including neighboring gate lines in the 2D mode and simultaneously supplying gate pulses for selecting the auxiliary subpixels to even-numbered gate lines in the 3D mode, wherein a size of the main subpixels is greater than a size of the auxiliary subpixels.

2. The device of claim 1, wherein the gate lines comprises:
odd-numbered gate lines for selecting the main subpixels; and
even-numbered gate lines for selecting the auxiliary subpixels.

3. The device of claim 2, wherein, in the 2D mode, the gate driving circuit shifts gate pulses supplied to the gate lines in units of the one pair of gate lines, and in the 3D mode, the gate driving circuit shifts gate pulses supplied to odd-numbered gate lines and then simultaneously supplies the gates pulse to the even-numbered gate lines.

4. The device of claim 1, further comprising:
a timing controller configured to supply digital video data of a 2D image and digital video data of a 3D image to the data driving circuit and control an operation timing of the data driving circuit and the gate driving circuit; and
a system board configured to supply the digital video data to the timing controller and supply a mode signal for discriminating the 2D mode and the 3D mode to the timing controller and the gate driving circuit.

5. The device of claim 4, wherein the gate driving circuit comprises:
a shift register configured to shifting a gate start pulse (GSP) according to a gate shift clock (GSC);
a level shifter configured to adjust a swing width of an output voltage of the shift register to output the same to the gate lines; and
a multiplexer array disposed between output terminals of the shift register and input terminals of the level shifter to select a branch path of an output signal of the shift register according to the mode signal.

6. The device of claim 5, wherein, in the 2D mode, the multiplexer array simultaneously supplies the output signal from the shift register to the neighboring input terminals of the level shifter, and in the 3D mode, the multiplexer array simultaneously supplies the last output signal from the shift register to even-numbered input terminals of the shift register.

7. The device of claim 1, wherein, in the 2D mode, the data driving circuit outputs the data voltage of the 2D image in synchronization with the gate pulses simultaneously supplied to the pair of gate lines, and in the 3D mode, the data driving circuit outputs the data voltage of the 3D image in synchronization with the gate pulses supplied to the odd-numbered gate lines and then outputs a black data voltage in synchronization with the gate pulses simultaneously supplied to the even-numbered gate lines.

8. A method for driving a stereoscopic image display device including a display panel comprising thin film transistors (TFTs) formed at crossings of data lines and gate lines and mxn (m and n are positive integers) number of pixels divided into main subpixels and auxiliary subpixels, the method comprising:
supplying a data voltage of a two-dimensional (2D) image to the data lines in a 2D mode;
simultaneously supplying gate pulses for selecting the main subpixels and the auxiliary subpixels to a pair of gate lines including neighboring gate lines in the 2D mode;
supplying a data voltage of a 3D image to the data lines in a three-dimensional (3D) mode; and
simultaneously supplying gate pulses for selecting the auxiliary subpixels to even-numbered data lines in the 3D mode, wherein a size of the main subpixels is greater than a size of the auxiliary subpixels.

9. The method of claim 8, wherein, in simultaneously supplying the gate pulses to the pair of gate lines including neighboring gate lines in the 2D mode, the gate pulses supplied to the gate lines are shifted in units of the pair of gate lines.

10. The method of claim 9, wherein, in simultaneously supplying gate pulses to the even-numbered gate lines in the 3D mode, the gate pulses supplied to odd-numbered gate lines are shifted and then the gate pulses are simultaneously supplied to the even-numbered gate lines.

11. The method of claim 8, wherein, in supplying the data voltage of the 2D image to the data lines in the 2D mode, the data voltage of the 2D image is supplied to the data lines in synchronization with the gate pulses simultaneously supplied to the pair of gate lines.

12. The method of claim 11, wherein the supplying of the data voltage of the 3D image to the data lines in the 3D mode comprises:
supplying the data voltage of the 3D image to the data lines in synchronization with the gate pulses supplied to the odd-numbered gate lines; and
supplying a black data voltage to the data lines in synchronization with the gate pulses simultaneously supplied to the even-numbered gate lines.

* * * * *